United States Patent
Gökkurt (10) Patent No.: US 12,441,919 B2
(45) Date of Patent: Oct. 14, 2025

(54) EDGE STRIP FOR WORKPIECES, IN PARTICULAR PIECES OF FURNITURE

(71) Applicant: FRITZ EGGER GmbH & Co. OG, St. Johann in Tirol (AT)

(72) Inventor: Yasemen Gökkurt, Istanbul (TR)

(73) Assignee: Fritz Egger GmbH & Co. OG, St. Johann in Tirol (AT)

( * ) Notice: Subject to any disclaimer, the term of this patent is extended or adjusted under 35 U.S.C. 154(b) by 175 days.

(21) Appl. No.: 18/017,118

(22) PCT Filed: Aug. 9, 2021

(86) PCT No.: PCT/EP2021/072121
§ 371 (c)(1),
(2) Date: Jan. 20, 2023

(87) PCT Pub. No.: WO2022/029336
PCT Pub. Date: Feb. 10, 2022

(65) Prior Publication Data
US 2023/0257637 A1    Aug. 17, 2023

(30) Foreign Application Priority Data

Aug. 7, 2020  (EP) .................... 20190093

(51) Int. Cl.
| | |
|---|---|
| B32B 3/10 | (2006.01) |
| A47B 96/20 | (2006.01) |
| C09J 11/04 | (2006.01) |
| C09J 11/06 | (2006.01) |
| C09J 175/04 | (2006.01) |

(52) U.S. Cl.
CPC ........... *C09J 175/04* (2013.01); *A47B 96/201* (2013.01); *C09J 11/04* (2013.01); *C09J 11/06* (2013.01); *C09J 2301/312* (2020.08); *C09J 2301/408* (2020.08); *C09J 2301/416* (2020.08)

(58) Field of Classification Search
None
See application file for complete search history.

(56) References Cited

U.S. PATENT DOCUMENTS

| | | | | |
|---|---|---|---|---|
| 2004/0030384 | A1* | 2/2004 | Wissman | B29C 65/1696 |
| | | | | 623/7 |
| 2010/0227128 | A1* | 9/2010 | Kramer | B29C 66/7487 |
| | | | | 428/458 |
| 2016/0318237 | A1 | 11/2016 | Streichardt et al. | |

FOREIGN PATENT DOCUMENTS

| | | | | |
|---|---|---|---|---|
| CN | 204688799 U | 10/2015 | | |
| DE | 19648756 A1 * | 5/1998 | ......... | C08G 18/0804 |
| DE | 202013011790 U1 | 7/2014 | | |

(Continued)

OTHER PUBLICATIONS

Translation of DE_20-2014-106167U1 (Year: 2014).*

*Primary Examiner* — Christopher M Polley
(74) *Attorney, Agent, or Firm* — The Webb Law Firm (57) ABSTRACT

Herein described is an edge strip, in particular for pieces of furniture, including at least one functional layer for affixing the edge strip to a narrow side of a workpiece, in particular a piece of furniture, wherein the functional layer contains an aliphatic thermoplastic polyurethane and an aromatic thermoplastic polyurethane. Further described is a method for manufacturing the edge strip, affixing an edge strip to a narrow side of a workpiece, used of an edge strip as well as the use of a relief pattern to reduce blocking of the edge strip.

22 Claims, 4 Drawing Sheets

(56) References Cited

FOREIGN PATENT DOCUMENTS

| DE | 202014106167 U1 | 3/2016 | |
|---|---|---|---|
| EP | 1163864 B1 | 9/2004 | |
| EP | 1852242 A1 | 11/2007 | |
| JP | H6255236 A | 9/1994 | |
| WO | 2009026977 A1 | 3/2009 | |
| WO | 2011020543 A1 | 2/2011 | |
| WO | WO-2018120742 A1 * | 7/2018 | ............. B32B 33/00 |

* cited by examiner

EDGE STRIP FOR WORKPIECES, IN PARTICULAR PIECES OF FURNITURE

CROSS-REFERENCE TO RELATED APPLICATIONS

This application is the United States national phase of International Application No. PCT/EP2021/072121 filed Aug. 9, 2021, and claims priority to European Patent Application No. 20190093.3 filed Aug. 7, 2020, the disclosures of which are hereby incorporated by reference in their entirety.

BACKGROUND OF THE INVENTION

Field of the Invention

The invention relates to an edge strip, in particular for pieces of furniture, comprising a functional layer for affixing the edge strip to a narrow side of a workpiece, in particular a piece of furniture.

Description of Related Art

Edge strips are affixed with at least one side to workpieces such as pieces of furniture to provide for optically appealing edges. Edge strips may also be called edge band or edge veneer. The workpieces to which they are applied comprise pieces of furniture, boards for making furniture, boards for interior construction, and ceiling panels, and often contain engineered wood materials such as engineered wood panels for example chipboards or fiberboards. However, the workpieces may also contain other materials and composite materials.

Several methods are known for affixing edge strips to workpieces. For example, a hot melt can be applied to the edge band and/or the workpiece in the process of affixing the edge strip to the workpiece. With this method of fixing, a visible joint normally results from the hot melt. In practice, this often results in unsightly joints.

In order to avoid the problem of unsightly hot melt joints, it was suggested to dispense with the hot melt for affixing the edge strip on a piece of furniture entirely. EP 1 163 864 B1 therefore discloses an adhesive-free connection between an edge strip made from plastic and a piece of furniture, that is, the edge strip is immediately attached to the piece of furniture without adhesive. For this purpose, the surface of the edge strip is melted by laser radiation, so that a laser-welded connection of an adhesive-free edge strip to the furniture panel takes place. It should be advantageous if the edge strip consists of plastic layers of different hardness, a layer of greater hardness of the edge strip being more than twice as thick as a layer of lower hardness, with only a part of the surface of the edge strip welded to the piece of furniture. By dispensing with a hot melt adhesive, the hot melt adhesive joints described should be avoided and, at the same time, hot melt adhesive should be saved. In practice, however, completely dispensing with a hot melt adhesive leads to unsatisfactory fastening of the edge strip to the furniture panel.

In order to overcome the problem of unsatisfactory fastening of edge strips to workpieces such as pieces of furniture, different approaches have been pursued using various adhesive materials.

EP 1 852 242 A1 describes a thermoplastic edge strip in which the edge strip is coextruded with a hot melt layer. WO 2009/026977 A1 describes an edge strip comprising a melting layer that contains both polar and unpolar portions in the molecular structure. However, improvement of the fastening was not shown in these documents.

Further problems that can occur when fastening an edge strip to a workpiece are that the edge strip moves when it is pressed against the workpiece, in particular a narrow side of a workpiece. This may make it difficult to precisely position the edge strip on the workpiece. When the edge strip is pressed against the workpiece, the layer of adhesive material—hot melt, a melting layer or a hot melt layer—may expand out of the joint and protrude from the joint. In addition, when removing any protrusions or overlapping material from the edge strip affixed to the workpiece to have a smooth transition from the edge strip to the workpiece, the adhesive material may draw unsightly strands. Also, the heat produced during removing protrusions or overlapping material from the edge strip, which is usually done by milling, may result in the adhesive material to become plastically deformable, which may in turn lead to a misplacement of the edge strip on the workpiece. Commonly, these problems are associated with each other and lead to unsightly joints or even waste product. These problems are usually referred to as smearing.

Therefore, it was an object of the invention to provide an edge strip that can be affixed to a workpiece, in particular a piece of furniture, without an unsightly joint. Preferably, the edge strip should be well fastened to the workpiece, in particular the piece of furniture. Advantageously, the edge strip can be affixed to the workpiece, in particular the piece of furniture, with a reduced amount of smearing.

Other and further objects, features and advantages of the present invention will become apparent more fully from the following description.

SUMMARY OF THE INVENTION

Some or all of the aforementioned objects are achieved with an edge strip, in particular for pieces of furniture, comprising at least one functional layer for affixing the edge strip to a narrow side of a workpiece, in particular a piece of furniture, wherein the functional layer contains an aliphatic thermoplastic polyurethane and an aromatic thermoplastic polyurethane.

It was found that an edge strip comprising a functional layer that contains an aliphatic thermoplastic polyurethane and an aromatic thermoplastic polyurethane can be affixed well to a workpiece, in particular a piece of furniture while at the same time, the smearing can be reduced. It was found that using only one type of thermoplastic polyurethane, the edge strip did not adhere very well to the workpiece, in particular the piece of furniture or the smearing was unacceptable. Thermoplastic polyurethanes are also advantageous in that they adhere well to the materials often used for pieces of furniture. Moreover, since both polymers contained in the functional layer are thermoplastic polyurethanes, they are compatible with each other. Thus, a compatibilizer for the two polymers may be omitted.

The invention further relates to a method for manufacturing an edge strip according to the invention, comprising forming, in particular extruding, at least one functional layer according to the invention.

The invention further relates to a method for affixing an edge strip according to the invention to a narrow side of a workpiece, in particular a piece of furniture, wherein the functional layer is softened using at least one of laser, microwaves, ultrasound, infrared, and hot air.

The invention further relates to a method for affixing a strip, in particular a strip made from a material as described herein for the structural layer, to a narrow side of a workpiece, in particular a piece of furniture, comprising applying an edge strip according to the invention, wherein the edge strip consists of the at least one functional layer, in particular of one functional layer, in between the narrow side of the workpiece and the strip.

The invention further relates to a use of an edge strip according to the invention, wherein the edge strip consists of the at least one functional layer, in particular of one functional layer, as an adhesive layer, in particular for affixing a strip, in particular a strip made from a material as described herein for the structural layer, to a narrow side of a workpiece, in particular a piece of furniture.

Lastly, the invention relates to the use of a relief pattern, in particular with a surface roughness Rz of 10 to 100 μm, preferably an Rz of 10 to 70 μm, more preferably an Rz of 10 to 40 μm, even more preferably an Rz of 15 to 30 μm, on a surface of a functional layer of an edge strip to reduce blocking of the edge strip, in particular when rolling up the edge strip.

DESCRIPTION OF THE INVENTION

The edge strip according to the invention comprises a functional layer containing an aromatic thermoplastic polyurethane and an aliphatic thermoplastic polyurethane.

Advantageously, the functional layer contains the aromatic thermoplastic polyurethane and the aliphatic thermoplastic polyurethane as a physical mixture.

Polyurethanes are manufactured by reacting a polyisocyanate compound with a polyol compound. For thermoplastic polyurethanes, the isocyanate compound and the polyol compound are preferably bifunctional. Various polyisocyanate and polyol compounds exist. The polyisocyanate compounds can contain an aromatic moiety. The polyisocyanates can also contain an aliphatic moiety. Similarly, the polyol compound can contain an aromatic moiety. The polyol compound can also contain an aliphatic moiety. When reacting a polyisocyanate compound and a polyol compound, wherein either contains an aromatic moiety, the resulting polyurethane contains aromatic moieties. A polyurethane containing aromatic moieties is referred to as an aromatic polyurethane. A thermoplastic polyurethane containing aromatic moieties is referred to as an aromatic thermoplastic polyurethane.

When reacting a polyisocyanate and a polyol compound, wherein both contain an aliphatic moiety and neither contains an aromatic moiety, the resulting polyurethane contains aliphatic moieties and does not contain aromatic moieties. A polyurethane that contains aliphatic moieties and does not contain aromatic moieties is referred to as an aliphatic polyurethane. A thermoplastic polyurethane that contains aliphatic moieties and does not contain aromatic moieties is referred to as an aliphatic thermoplastic polyurethane.

Preferred embodiments are specified in the dependent claims and will be explained hereinafter.

Different polyurethanes can be employed as the aliphatic thermoplastic polyurethane.

Different polyisocyanates may be used for the manufacture of aliphatic thermoplastic polyurethanes, for example a polyisocyanate selected from the group consisting of ethylene diisocyanate, 1,4-tetramethylene diisocyanate, 1,6-hexamethylene diisocyanate, and mixtures thereof.

Different polyisocyanates may be used for the manufacture of aromatic thermoplastic polyurethanes, for example a polyisocyanate selected from the group consisting of 2,4-toluene diisocyanate, 2,6-toluene diisocyanate, 2,2'-methylene diphenyl diisocyanate, 2,4'-methylene diphenyl diisocyanate, 4,4'-methylene diphenyl diisocyanate, naphthylene 1,5-diisocyanate, and mixtures thereof. A preferred polyisocyanate for the manufacture of aromatic thermoplastic polyurethanes is 4,4'-methylene diphenyl diisocyanate.

Different polyols may be used for aromatic thermoplastic polyurethanes and for aliphatic thermoplastic polyurethanes such as polyether polyols or polyester polyols. Exemplary polyols may have a functionality of 2. Exemplary polyols may further have a weight average molecular weight from 2'000 to 15'000 g/mol. The weight average molecular weight is preferably determined by gel permeation chromatography using a cross-linked polystyrene column, THF as the eluent and polystyrene standards. An RI detector may be used as detector.

For the aliphatic thermoplastic polyurethane, preferably polyester polyols are employed. For the aromatic thermoplastic polyurethane, preferably polyether polyols are employed, for example based on butanediol.

The aliphatic thermoplastic polyurethane may have various melt flow indices. Advantageously, the aliphatic thermoplastic polyurethane has a melt flow index of 2 to 100 g/10 min, preferably 5 to 30 g/10 min, more preferably 5 to 25 g/10 min, even more preferably 5 to 20 g/10 min, most preferred 10 to 15 g/10 min.

The melt flow index of the aliphatic thermoplastic polyurethane is determined according to norm ASTM D 1238-04, in particular ASTM D 1238-04b, at a temperature of 150° C. using a weight of 2.16 kg.

The aliphatic thermoplastic polyurethane may have a hardness determined according to ASTM D2240 of 70 to 110 Shore A, preferably from 75 to 105 Shore A, more preferably from 80 to 100 Shore A. In particular, hardness may be determined according to ASTM D2240-15e1.

The aliphatic thermoplastic polyurethane may have a tensile strength determined according to ASTM D412 of 200 to 400 kg/cm$^2$, preferably from 225 to 375 kg/cm$^2$, more preferably from 250 to 350 kg/cm$^2$. In particular, tensile strength may be determined according to ASTM D412-16.

The aliphatic thermoplastic polyurethane may have an elongation at break determined according to ASTM D412 of 450% to 750%, preferably from 500% to 700%, more preferably from 550% to 650%. In particular, elongation at break may be determined according to ASTM D412-16.

Suitable aliphatic thermoplastic polyurethanes may for example be obtained from BASF SE, Kempro Kimyasal Maddeler, Covestro AG, Lubrizol Corporation, or similar providers of aliphatic thermoplastic polyurethanes.

The aromatic thermoplastic polyurethane advantageously has a melt flow index of 2 to 100 g/10 min, preferably 40 to 100 g/10 min, more preferably 40 to 90 g/10 min, even more preferably 45 to 85 g/10 min, most preferred 50 to 80 g/10 min.

The melt flow index of the aromatic thermoplastic polyurethane is determined according to norm ASTM D 1238-04, in particular ASTM D 1238-04b, at a temperature of 150° C. using a weight of 2.16 kg.

With aliphatic thermoplastic polyurethanes and aromatic thermoplastic polyurethanes with melt flow indices in the aforementioned ranges, the strength of the fastening of the edge strip to the workpiece, in particular the piece of furniture can be adjusted and/or improved. Further, the smearing can be adjusted.

The aromatic thermoplastic polyurethane may have a hardness determined according to ASTM D2240 of 50 to 90 Shore A, preferably from 55 to 85 Shore A, more preferably from 60 to 80 Shore A. In particular, hardness may be determined according to ASTM D2240-15e1.

The aromatic thermoplastic polyurethane may have a tensile strength determined according to ASTM D 412 of 30 to 90 kg/cm$^2$, preferably from 40 to 80 kg/cm$^2$, more preferably from 50 to 70 kg/cm$^2$. In particular, tensile strength may be determined according to ASTM D412-16.

Suitable aromatic thermoplastic polyurethanes may for example be obtained from BASF SE, Kempro Kimyasal Maddeler, Covestro AG, Lubrizol Corporation, or similar providers of aromatic thermoplastic polyurethanes.

The aromatic thermoplastic polyurethane may have an elongation at break determined according to ASTM D412 of 450% to 750%, preferably from 500% to 700%, more preferably from 550% to 650%. In particular, elongation at break may be determined according to ASTM D412-16.

The functional layer may contain the thermoplastic polyurethanes in various amounts. Advantageously, the functional layer contains the aliphatic thermoplastic polyurethane in an amount of 10 to 90 wt. %, preferably 50 to 90 wt. %, more preferably 65 to 90 wt. %, even more preferably 70 to 85 wt. %, most preferred 75 to 85 wt. %, based on the total mass of the functional layer.

The functional layer advantageously contains the aromatic thermoplastic polyurethane in an amount of 1 to 90 wt. %, preferably 1 to 50 wt. %, more preferably 1 to 20 wt. %, even more preferably 3 to 17 wt. %, most preferred 5 to 15 wt. %, based on the total mass of the functional layer. With these amounts of the thermoplastic polyurethanes, it is possible to obtain an edge strip that adheres well to a workpiece, in particular a piece of furniture.

Preferably, the aliphatic and the aromatic thermoplastic polyurethane together constitute more than 50 wt. %, more preferably more than 70 wt. %, even more preferably more than 80 wt. %, most preferred more than 90 wt. % of the total mass of the functional layer.

The functional layer may also contain further components. In particular, the functional layer may contain a filler. With the aid of a filler, it is possible to reduce the smearing of the edge strip. Advantageously, the functional layer contains a filler in an amount of 1 to 30 wt. %, preferably 1 to 20 wt. %, more preferably 2 to 17 wt. %, even more preferably 3 to 15 wt. %, most preferred 5 to 13 wt. %, based on the total mass of the functional layer. With the aforementioned amounts of fillers, the smearing may be reduced while the edge strip still adheres well to the workpiece, in particular the piece of furniture.

Various materials may be employed as fillers. Advantageously, the filler is an inorganic filler, preferably a mineral or mineral-based filler. More preferably, the filler is selected from the group consisting of talcum, calcium carbonate, dolomite, silica, mica, kaolin, diatomaceous earth, glass, barite, wollastonite, calcium sulphate, barium sulphate, halloysite, zinc oxide, and mixtures thereof. Most preferably, the filler is talcum. Inorganic fillers and in particular mineral fillers such as the aforementioned fillers are robust and inert such that they do not degrade themselves or other components of the functional layer due to the heat generated during affixing the edge strip to a workpiece, in particular a piece of furniture.

Moreover, the functional layer may also contain a nucleating agent. A nucleating agent can help to improve the crystallization of the functional layer. In particular, a nucleating agent may help to increase the crystallization temperature. In this way, the smearing can be improved as harder layers often tend to exhibit reduced smearing. Further, the production speed can be increased by incorporating a nucleating agent.

If the functional layer contains a nucleating agent, the functional layer advantageously contains the nucleating agent in an amount of 0.05 to 10 wt. %, preferably 0.05 to 5 wt. %, more preferably 0.1 to 3 wt. %, even more preferably 0.1 to 1 wt. %, most preferred 0.5 to 0.9 wt. %, based on the total mass of the functional layer. It was found that when the nucleating agent is present in these amounts in the functional layer, the smearing can be reduced while the edge strip still adheres well to a workpiece, in particular a piece of furniture. Further, the edge strip can be manufactured at good production speeds.

Various nucleating agents can be used in the present invention. Advantageously, the nucleating agent is selected from an alkaline metal salt of a carboxylic acid having 10 to 40 carbon atoms, silicic acid, cyanuric acid, sorbitol derivatives such as bis(benzylidene)sorbitol, 1,3-di(p-hydroxyl) benzylidene sorbitol, 2,4-di(p-hydroxyl) benzylidene sorbitol, phosphonium salts, triphenyl phosphine, tributyl phosphine, trimethyl phosphine, dimethyl phenyl phosphine, methyl diphenyl phosphine, tris(2-ethylhexyl) phosphine, tetrabutyl-phosphonium hexafluorophosphate, tetrabutyl-phosphonium-hydrogen sulfate, tetrabutylammonium-phenylphosphonate), pyridinium salts, tritylpyridinium tetrafluoroborate, pyrrolidinium salts, 1-butyl-1-methylpyrrolidinium bromide, sulfonium salts, triphenylsulfonium tetrafluoroborate, sulfonates, sodium octyl sulfonate, phosphonates, phosphonic acids, phosphonic esters, phosphonic salts, phosphinic acid, phosphinic esters, phosphinic salts, phosphonamides, phosphinamides, phosphonates, tetrabutylammonium phenylphosphonate, and mixtures thereof.

Preferably, the nucleating agent is selected from an alkaline metal salt of a carboxylic acid having 10 to 40 carbon atoms, cyanuric acid, sorbitol derivatives such as bis(benzylidene)sorbitol, 1,3-di(p-hydroxyl) benzylidene sorbitol, 2,4-di (p-hydroxyl) benzylidene sorbitol, phosphonium salts, triphenyl phosphine, tributyl phosphine, trimethyl phosphine, dimethyl phenyl phosphine, methyl diphenyl phosphine, tris(2-ethylhexyl) phosphine, tetrabutyl-phosphonium hexafluorophosphate, tetrabutyl-phosphonium-hydrogen sulfate, tetrabutylammonium-phenylphosphonate), pyridinium salts, tritylpyridinium tetrafluoroborate, pyrrolidinium salts, 1-butyl-1-methylpyrrolidinium bromide, sulfonium salts, triphenylsulfonium tetrafluoroborate, sulfonates, sodium octyl sulfonate, phosphonates, phosphonic acids, phosphonic esters, phosphonic salts, phosphinic acid, phosphinic esters, phosphinic salts, phosphonamides, phosphinamides, phosphonates, tetrabutylammonium phenylphosphonate, and mixtures thereof. The alkaline metal salt of a carboxylic acid having 10 to 40 carbon atoms is preferably a sodium salt of a carboxylic acid having 10 to 40 carbon atoms. It was found that with the aforementioned nucleating agents, the crystallization can be improved, thereby reducing the smearing. More preferably, the nucleating agent is an alkaline metal salt, in particular an alkaline metal salt, more particularly a sodium salt, of a carboxylic acid having 10 to 40 carbon atoms. It was found that the alkaline metal salt of a carboxylic acid having 10 to 40 carbon atoms is well compatible with the other components in the functional layer. It was also found that the alkaline metal salt of a carboxylic acid having 10 to 40 carbon atoms is effective at improving the crystallization of the functional layer and thereby at reducing the smearing and increasing production speed. Even better results were obtained when the carboxylic acid in the alkaline metal salt, in particular the sodium salt, has 15 to 35 carbon atoms, more preferably 20 to 35 carbon atoms, most preferably 25 to 35 carbon atoms. The carboxylic acid having 10 to 40, preferably 15 to 35, more preferably 25 to 35, carbon atoms in the alkaline metal salt is preferably an acyclic carboxylic acid, more preferably a linear carboxylic acid.

The functional layer may also contain various additives. In particular, the functional layer may contain one or several additives. Advantageously, the functional layer contains an additive selected from the group consisting of antioxidants, UV absorbers, chain extenders, pigments, dyes, antislip agents, antiblock agents, flow modifiers, hindered amine light stabilizers, and mixtures thereof.

Antioxidants may for example be obtained from MPI Chemie, BASF SE, Clariant AG, or similar providers of plastics additives. Antioxidants may help to increase the heat stability of the functional layer.

UV absorbers may for example be obtained from MPI Chemie, BASF SE, Solvay SA, or similar providers of UV absorbers. UV absorbers may help to increase the UV stability of the functional layer.

Chain extenders may for example be obtained from Vertellus Holdings LLC, BASF SE, Qingdao Sciendoc Chemical Co., Ltd., or similar providers of chain extenders. Chain extenders may help to improve the smearing of the functional layer.

Pigments and dyes may for example be obtained from BASF SE, Altana AG, Merck KGaA, Clariant AG, or similar providers of pigments and dyes. With pigments and dyes, the color of the functional layer may be adjusted. The pigments and dyes may be in different forms. Preferably, the pigments and dyes are able to dissolve or disperse, more preferably are dissolved or dispersed, in the aliphatic and/or the aromatic thermoplastic polyurethane.

Antislip agents may for example be obtained from Kafrit Industries Ltd, A. Schulman Inc., Ampacet Corporation or similar providers of antislip agents. Antislip agents may help to increase manufacturing speed.

Antiblock agents may for example be obtained from Kafrit Industries Ltd, Ampacet Corporation, Croda International plc, or similar providers of antiblock agents. Antiblock agents may help to prevent undesired premature sticking of the functional layer to other surfaces.

Flow modifiers may for example be obtained from Vertellus Holdings LLC, BASF SE, Flow Polymers LLC, or similar providers of flow modifiers. Flow modifiers may help to adjust the flowing properties of the functional layer, for example during processing.

Hindered amine light stabilizers may for example be obtained from BASF SE, Clariant AG, Azelis SA, or similar providers of hindered amine light stabilizers. Hindered amine light stabilizers may help to increase the light stability of the functional layer.

The functional layer may contain additives in various amounts. Advantageously, the total amount of additives in the functional layer is from 0.1 to 15 wt. %, preferably from 0.1 to 10 wt. %, based on the total mass of the functional layer. The additives may be contained individually in the functional layer in an amount of 0.1 to 5 wt. %, preferably 0.1 to 3 wt. %, based on the total mass of the functional layer. Additives other than pigments or dyes may be contained individually in the functional layer most preferably in an amount of 0.1 to 1 wt. %, based on the total mass of the functional layer.

Advantageously, the functional layer contains energy absorbing additives. Energy absorbing additives may activate the functional layer, thereby facilitating fixing the edge strip to a workpiece, in particular a piece of furniture.

Depending on the type of energy used in the process of affixing the edge strip to a workpiece, in particular a piece of furniture, different energy absorbing additives may be used. Examples for energy absorbing additives are heat absorbing additives, radiation absorbing additives such as microwave absorbing additives, and light absorbing additives. Preferably the functional layer contains light and/or radiation absorbing additives. More preferably, the functional layer contains laser absorbing particles. Laser absorbing particles are particularly useful when the edge strip is applied using laser activation.

Energy absorbing additives are advantageously contained in the functional layer in an amount of 0.1 to 5 wt. %, preferably 0.1 to 3 wt. %, more preferably 0.1 to 1 wt. %, based on the total mass of the functional layer.

The aliphatic thermoplastic polyurethane, the aromatic thermoplastic polyurethane, the filler, the nucleating agent, the additives, and the energy absorbing additives may each individually be referred to as a component of the functional layer. Preferably, all components of the functional layer add up to 100 wt. %, based on the weight of the functional layer.

The functional layer may also have at least one structured surface. Advantageously, a surface of the functional layer at least partially has a relief pattern. The relief pattern is preferably on the surface that will be used for affixing the edge strip to the workpiece, in particular the piece of furniture. The relief pattern advantageously has a surface roughness Rz of 10 to 100 µm, preferably an Rz of 10 to 70 µm, more preferably an Rz of 10 to 40 µm, even more preferably an Rz of 15 to 30 µm. It was found that with the aid of a relief pattern, in particular with a relief pattern with a surface roughness in the aforementioned ranges, blocking of the edge strip can be reduced, in particular when rolling up the edge strip, more particularly when rolling up the edge strip after its manufacture. In this way, the use of antiblock or antislip agents can be avoided. Moreover, the edge strip can be rolled up at higher temperatures resulting in increased production speeds. The surface roughness Rz is preferably measured according to DIN EN ISO 4287, more preferably according to DIN EN ISO 4287:2010-07.

The edge strip comprises at least one functional layer. The edge strip may also comprise two or more functional layers. If the edge strip comprises two or more functional layers, the functional layers may be the same or different. Two or more functional layers of an edge strip may be arranged differently. For example, two functional layers may be arranged on top of each other such that only one of the functional layers comes into direct contact with the workpiece. In this way, the functional layer in direct contact with the workpiece may be optimized for adhesion of the edge strip to the workpiece while the other functional layer may serve other purposes, for example decorative purposes or as a tie layer between the functional layer and another layer such as a decorative layer. Two functional layers may also be arranged side by side. This can be advantageous for example to adapt the edge strip to a workpiece that is inhomogeneous. Three or more functional layers may be arranged on top of each other, side by side, or combinations thereof. Three functional layers side by side may be particularly advantageous for lightweight boards or honeycomb boards. If the edge strip comprises two or more functional layers, the functional layer or layers that will be in direct contact with the workpiece, in particular the piece of furniture, preferably has a relief pattern as described herein.

The edge strip may also consist of the at least one functional layer. In this case, the edge strip may consist of one or more functional layers, such as two, three, or four functional layers, but preferably consists of one functional layer.

The edge strip may also comprise a structural layer connected to the functional layer. The structural layer may provide mechanical strength to the edge strip. The structural layer may also provide a decorative effect to the edge strip.

The structural layer may be directly connected to the functional layer. In this way, the edge strip may be manufactured by coextrusion. The structural layer may also be indirectly connected to the functional layer. For example, an adhesive layer or a tie layer or a primer may be in between the structural layer and the functional layer. As described above, a tie layer may be formed by an additional functional layer. Preferably, a primer is in between the structural layer and the functional layer.

The structural layer may be made from various materials. The structural layer may be made from paper, cardboard, veneer, continuous pressure laminate, or a thermoplastic material. Continuous pressure laminate edges are sometimes also referred to as melamine edges and can be obtained from specialized trade. The structural layer is advantageously made from a thermoplastic material, in particular a thermoplastic polymer. The thermoplastic material may be a thermoplastic material made from fossil resources or a thermoplastic material made from biobased substances or a thermoplastic material made both from fossil resources and biobased substances, such as a thermoplastic copolymer or a composite material. Preferably, the thermoplastic material can be processed using an extruder. In particular, the thermoplastic material has a melting point below 400° C. The thermoplastic material is preferably selected from the group consisting of wood plastic composite, poly(ethylene), poly(ethylene) produced from biobased substances, poly(propylene), poly(propylene) produced from biobased substances, poly(lactic acid), starch, thermoplastic starch, acrylonitrile-butadiene-styrene copolymer, acrylonitrile-styrene-acrylate copolymer, poly(vinyl chloride), poly(methyl methacrylate), poly(ethylene terephthalate), olefin-based thermoplastic elastomer, thermoplastic polyurethane, thermoplastic copolyester, styrene block copolymers such as styrene-butadiene-styrene copolymer, styrene-ethylene-butylene-styrene copolymer, styrene-ethylene-propylene-styrene copolymer, styrene-ethylene-ethylene-propylene-styrene copolymer, poly(methyl methacrylate-co-butadiene-co-styrene), thermoplastic copolyamide, and mixtures thereof. The aforementioned materials are commonly used in the manufacture of edge strips and are, thus, commercially available. Polymers made from biobased resources or substances are for example polymers made from renewable resources, such as poly(ethylene) made from ethanol derived from sugar canes.

The functional layer may be connected to the structural layer by means of coextrusion. This mode of connection is particularly useful for large-scale manufacturing. The functional layer may also be connected to the structural layer by means of injection molding. This mode of connection is particularly useful for small-scale manufacturing. Connection of the functional layer to the structural layer by coextrusion or by injection molding is preferred if the functional layer is directly connected to the structural layer.

The functional layer may also be applied to the structural layer in an additional step after manufacturing the structural layer. This provides more flexibility in the manufacturing process. Preferably, the functional layer may be applied to the structural layer in an additional step after manufacturing the structural layer by post-coating, post-extrusion, hot-coating, or injection molding. More preferably the functional layer is applied by post-extrusion.

The functional layer is preferably made by extrusion, in particular by post-extrusion.

The functional layer advantageously has a thickness of 0.05 to 5 mm, preferably 0.05 to 2 mm, more preferably 0.05 to 1 mm, most preferred 0.1 to 0.5 mm or 0.1 to 0.25 mm. The structural layer advantageously has a thickness of 0.1 to 10 mm, preferably 0.1 to 8 mm, more preferably from 0.3 to 4 mm.

The edge strip advantageously has a width of 5 to 120 mm, preferably 5 to 80 mm, more preferably 5 to 40 mm, even more preferably 5 to 25 mm, most preferred 18 to 28 mm. According to another embodiment, the edge strip has a width of 5 to 120 mm, preferably 5 to 80 mm, more preferably 12 to 65 mm.

In the manufacture of the edge strip, it is possible to manufacture several edge strips simultaneously. In this case, preferably an edge strip with a width of 5 to 800 mm, more preferably 5 to 500 mm, most preferred 8 to 420 mm or preferably with a width of 10 to 800 mm, more preferably 10 to 500 mm, most preferred 20 to 420 mm, is manufactured in a first step that is cut into the aforementioned widths in a subsequent step.

According to a preferred embodiment, the functional layer contains, based on the total mass of the functional layer,
 the aliphatic thermoplastic polyurethane in an amount of 65 to 90 wt. %, preferably 70 to 85 wt. %, more preferably 75 to 85 wt. %,
 the aromatic thermoplastic polyurethane in an amount of 1 to 20 wt. %, preferably 3 to 17 wt. %, more preferably 5 to 15 wt. %,
 optionally a filler in an amount of 2 to 17 wt. %, preferably 3 to 15 wt. %, more preferably 5 to 13 wt. %,
 a nucleating agent in an amount of 0.1 to 3 wt. %, preferably 0.1 to 1 wt. %, more preferred 0.5 to 0.9 wt. %,
 and optionally additives in a total amount of 0.1 to 10 wt. %, wherein the components add up to 100 wt. %.

It was found that an edge strip with a functional layer comprising the combination of components in these ranges adheres well to a workpiece, in particular a piece of furniture, and may be affixed thereto with reduced smearing.

According to another preferred embodiment, the aliphatic thermoplastic polyurethane has a melt flow index of 10 to 15 g/10 min, wherein the melt flow index of the aliphatic thermoplastic polyurethane is determined according to norm ASTM D 1238-04, in particular ASTM D 1238-04b, at a temperature of 150° C. using a weight of 2.16 kg, and the aromatic thermoplastic polyurethane has a melt flow index of 50 to 80 g/10 min, wherein the melt flow index of the aromatic thermoplastic polyurethane is determined according to norm ASTM D 1238-04, in particular ASTM D 1238-04b, at a temperature of 150° C. using a weight of 2.16 kg.

The edge strip according to the invention can be affixed to different workpieces. Examples for workpieces are a piece of furniture, a board for making furniture, a board for interior construction, and a ceiling panel.

Another object of the invention is a method for manufacturing an edge strip according to the invention, comprising forming at least one functional layer according to the invention. Preferably, the method for manufacturing an edge strip according to the invention comprises extruding at least one functional layer according to the invention.

In the method according to the invention, a structural layer as defined herein may be coextruded with the functional layer according to the invention. In this way, a direct connection between the functional layer and the structural layer can be achieved. Alternatively, in the method according to the invention, the functional layer according to the invention may also be applied to a structural layer according to the invention. The structural layer is preferably prefabricated. Preferably, the functional layer is applied to the structural layer, in particular the prefabricated structural layer, using a method as defined herein. More preferably, the functional layer is applied to the structural layer in an additional step after manufacturing the structural layer by post-coating, post-extrusion, hot-coating, or injection molding. Even more preferably, a primer is applied to the structural layer, in particular the prefabricated structural layer, and the functional layer is applied to the primer on the structural layer subsequently, in particular by post-extrusion. However, it is also possible to prefabricate both the structural layer and the functional layer. The prefabricated structural layer and the prefabricated functional layer can then be connected by laminating. Before laminating, a primer may be applied to the prefabricated structural layer and/or the prefabricated functional layer. Most preferably, the functional layer is applied to the structural layer in an additional step after manufacturing the structural layer by post-extrusion, in particular to a primer on the structural layer.

In the method according to the invention, a relief pattern may be applied to a surface of the functional layer. Preferably, the relief pattern is applied by embossing. The relief pattern advantageously has a surface roughness Rz of 10 to 100 μm, preferably an Rz of 10 to 70 μm, more preferably an Rz of 10 to 40 μm, even more preferably an Rz of 15 to 30 μm. The surface roughness Rz is preferably measured according to DIN EN ISO 4287, more preferably according to DIN EN ISO 4287:2010-07.

Another object of the invention is a method for affixing an edge strip according to the invention to a narrow side of a workpiece, in particular a piece of furniture, wherein the functional layer is activated using at least one of laser, microwaves, ultrasound, infrared, and hot air. Preferably, the functional layer is activated using laser or hot air.

If a laser is used for softening the functional layer, the laser power may be from 5 to 50 J/cm², preferably from 10 to 30 J/cm², more preferably from 15 to 25 J/cm². The laser power may in particular depend on the color of the functional layer. For functional layers with a dark color, a lower laser power is required.

If the functional layer is softened using hot air, the hot air is supplied at a temperature of 300 to 650° C. The hot air is preferably supplied at a pressure of 2 to 6 bars.

If a machine is used to affix the edge strip to the workpiece, in particular the piece of furniture, the machine preferably employs a pressure of 1 to 6 bars, preferably 2 to 6 bars, to press the edge strip to the workpiece. The machine may in particular work at a line speed of 3 to 80 m/min, preferably 3 to 30 m/min, more preferably 10 to 20 m/min.

According to another aspect, the invention relates to a method for affixing a strip, in particular a strip made from a material as described herein for the structural layer, to a narrow side of a workpiece, in particular a piece of furniture, comprising applying an edge strip according to the invention, wherein the edge strip consists of the at least one functional layer, in particular of one functional layer, in between the narrow side of the workpiece and the strip.

According to a further aspect, the invention relates to a use of an edge strip according to the invention, wherein the edge strip consists of the at least one functional layer, in particular of one functional layer, as an adhesive layer, in particular for affixing a strip, in particular a strip made from a material as described herein for the structural layer, to a narrow side of a workpiece, in particular a piece of furniture.

According to the two aspects described above, the edge strip consisting of the at least one functional layer is employed similarly to a double-sided adhesive tape. The edge strip may consist of one or more functional layers, such as two, three, or four functional layers. Preferably, the edge strip consists of one functional layer. The details concerning the functional layer described above for the edge strip according to the invention apply to these aspects of the invention accordingly. The strip affixed to the narrow side of a workpiece according to these aspects corresponds or preferably consists of the structural layer as described herein. Preferably, the functional layer is activated using at least one of laser, microwaves, ultrasound, infrared, and hot air, more preferably using laser or hot air.

Another object of the invention is the use of a relief pattern, in particular with a surface roughness Rz of 10 to 100 μm, preferably an Rz of 10 to 70 μm, more preferably an Rz of 10 to 40 μm, even more preferably an Rz of 15 to 30 μm, on a surface of a functional layer of an edge strip to reduce blocking of the edge strip, in particular when rolling up the edge strip. More particularly, the relief pattern is used to reduce blocking when rolling up the edge strip after manufacturing the edge strip. The surface roughness Rz is preferably measured according to DIN EN ISO 4287, more preferably according to DIN EN ISO 4287:2010-07.

EXAMPLES

Materials:
TPU1: Aliphatic thermoplastic polyurethane having a hardness according to ASTM D2240-15 of about 90 Shore A, a density at room temperature according to ASTM D792-13 of about 1.2 g/cm³, a tensile strength according to ASTM D412-16 of about 300 kg/cm², an elongation at break according to ASTM D412-16 of about 600%, and a melt flow index according to ASTM D1238-04 of 10 to 15 g/10 min at 150° C. using a weight of 2.16 kg.
TPU2: Aromatic thermoplastic polyurethane having a hardness according to ASTM D2240-15 of about 70 Shore A, a density at room temperature according to ASTM D792-13 of about 1.19 g/cm³, a tensile strength according to ASTM D412-16 of about 60 kg/cm², an elongation at break according to ASTM D412-16 of about 600%, and a melt flow index according to ASTM 1238-04 of 50 to 80 g/10 min at 150° C. using a weight of 2.16 kg.

TPU3: Aliphatic thermoplastic polyurethane having a hardness according to ASTM D2240-15 of about 90 Shore A, a density at room temperature according to ASTM D792-13 of about 1.2 g/cm$^3$, a tensile strength according to ASTM D412-16 of about 200 kg/cm$^2$, an elongation at break according to ASTM D412-16 of about 600%, and a melt flow index according to ASTM D1238-04 of 35 to 55 g/10 min at 150° C. using a weight of 2.16 kg.

TPU4: Aromatic thermoplastic polyurethane having a hardness according to ASTM D2240-15 of about 90 Shore A, a density at 20° C. according to ASTM D792-13 of about 1.17 g/cm$^3$, a tensile strength at break according to ASTM D412-16 of about 20 MPa, an elongation at break according to ASTM D412-16 of about 550%, and a melt flow index according to ISO 1133-1:2012-03 of 4 to g/10 min at 170° C. using a weight of 2.16 kg.

Filler: Talcum

Nuc: Nucleating agent; sodium octacosanoate

Nuc2: Alternative nucleating agent; 1,2,3-tridesoxy-4,6:5,7-bis-O-[(4-propylphenyl)methylene]nonitol sorbitol LP: laser pigment; copper(II) hydroxide phosphate Add: additives comprising antioxidants, chain extenders, pigments, UV stabilizers Methods:

In order to study the effect of the nucleating agent, three functional layers FL1 to FL3 with a thickness of 0.2 mm were prepared using the following formulations containing TPU1, TPU2, and Nuc in various amounts. An additional functional layer FL4 was made that had an identical composition as FL3 except that 1,2,3-tridesoxy-4,6:5,7-bis-O-[(4-propylphenyl)methylene]nonitol sorbitol (Nuc2) was used instead of sodium octacosanoate (Nuc).

TABLE 1

Composition of manufactured functional layers FL1 to FL3

| Compound | Amount of Compound in functional layer No. [wt. %] | | |
|---|---|---|---|
| | FL1 | FL2 | FL3 |
| TPU1 | 86.3 | 85.9 | 85.7 |
| TPU2 | 10.2 | 10.2 | 10.2 |
| Nuc | 0 | 0.4 | 0.6 |
| Add[a] | 2.5 | 2.5 | 2.5 |
| LP | 1 | 1 | 1 |

Explanations to Table 1:
[a]only pigment.

Figure 1:
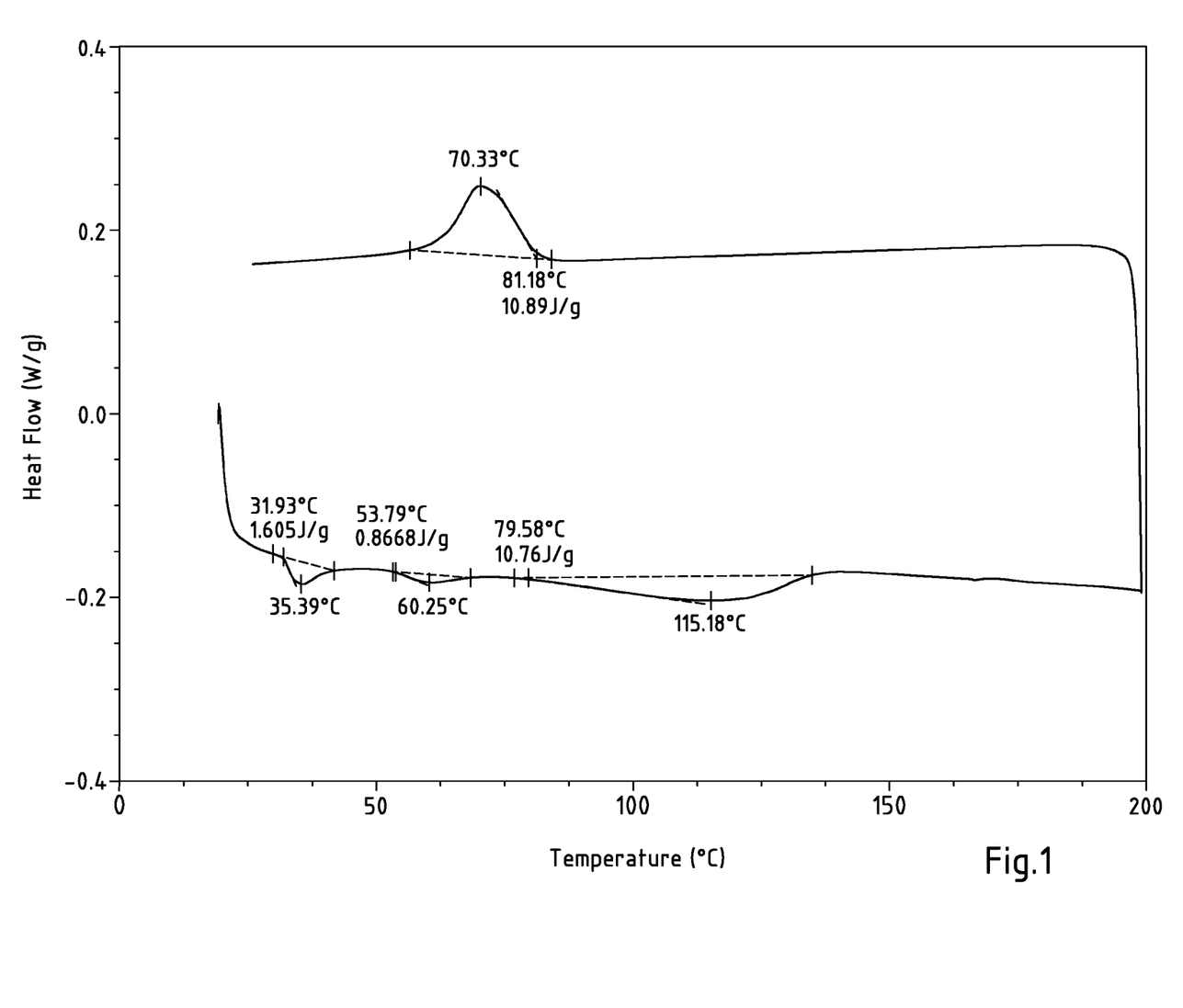
FIG. 1 shows a differential scanning calorimetry (DSC) analysis of a functional layer that does not contain any nucleating gent.
Figure 2:
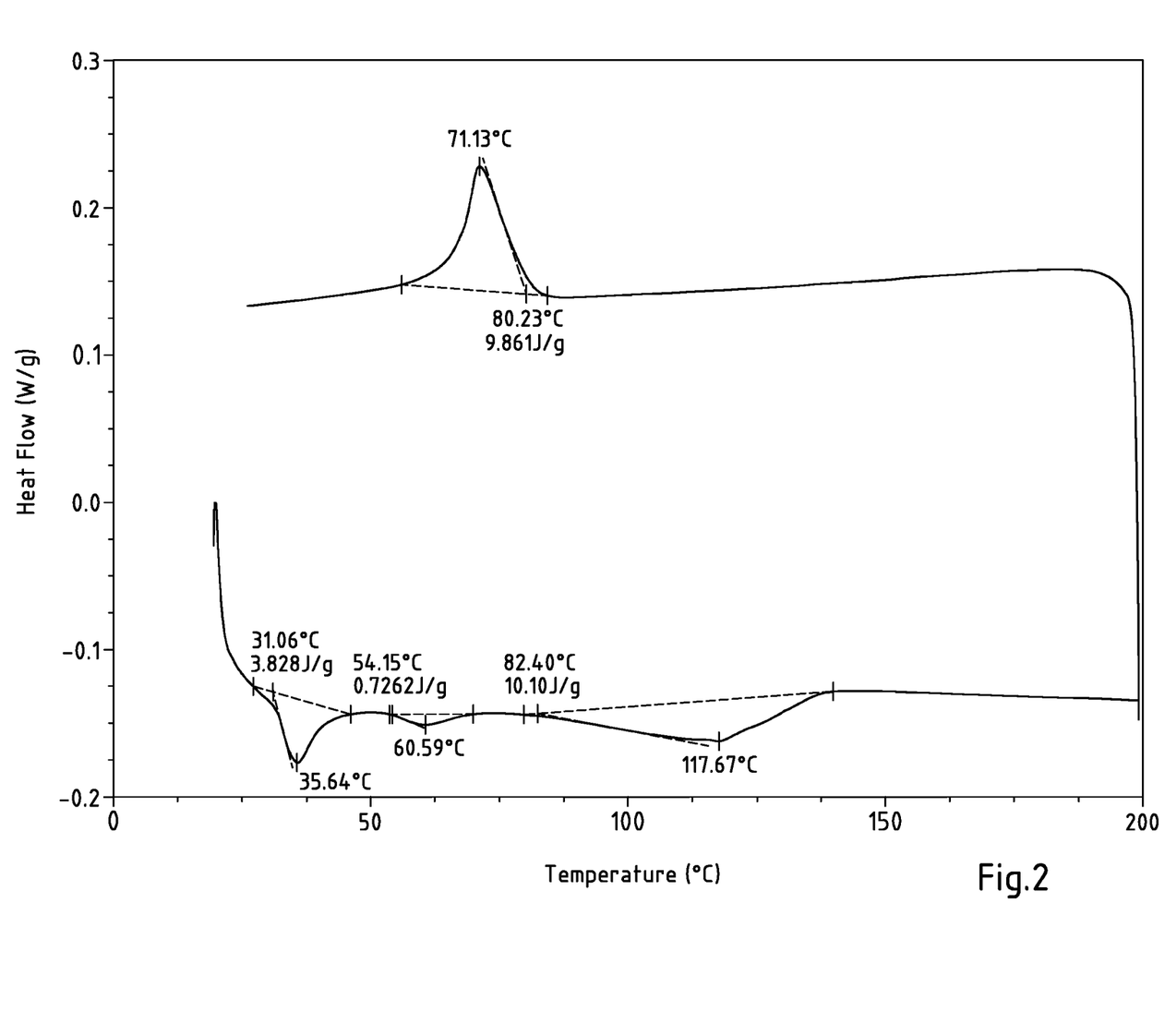
FIG. 2 shows a differential scanning calorimetry (DSC) analysis of a functional layer comprising 0.4 wt. %, based on the total mass of the functional layer, of nucleating agent.
Figure 3:
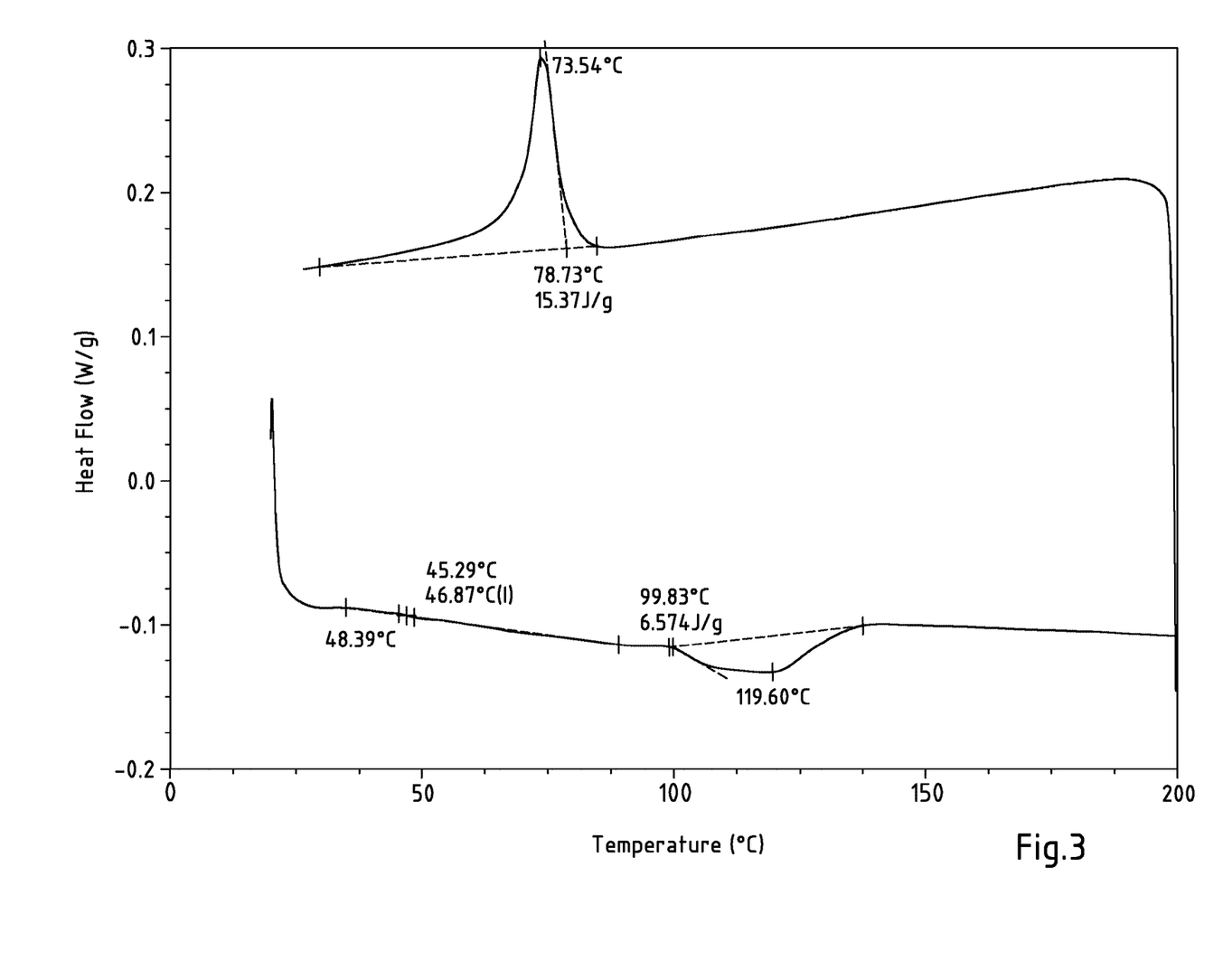
FIG. 3 shows a differential scanning calorimetry (DSC) analysis of a functional layer comprising 0.6 wt. %, based on the total mass of the functional layer, of nucleating agent.
Figure 4:
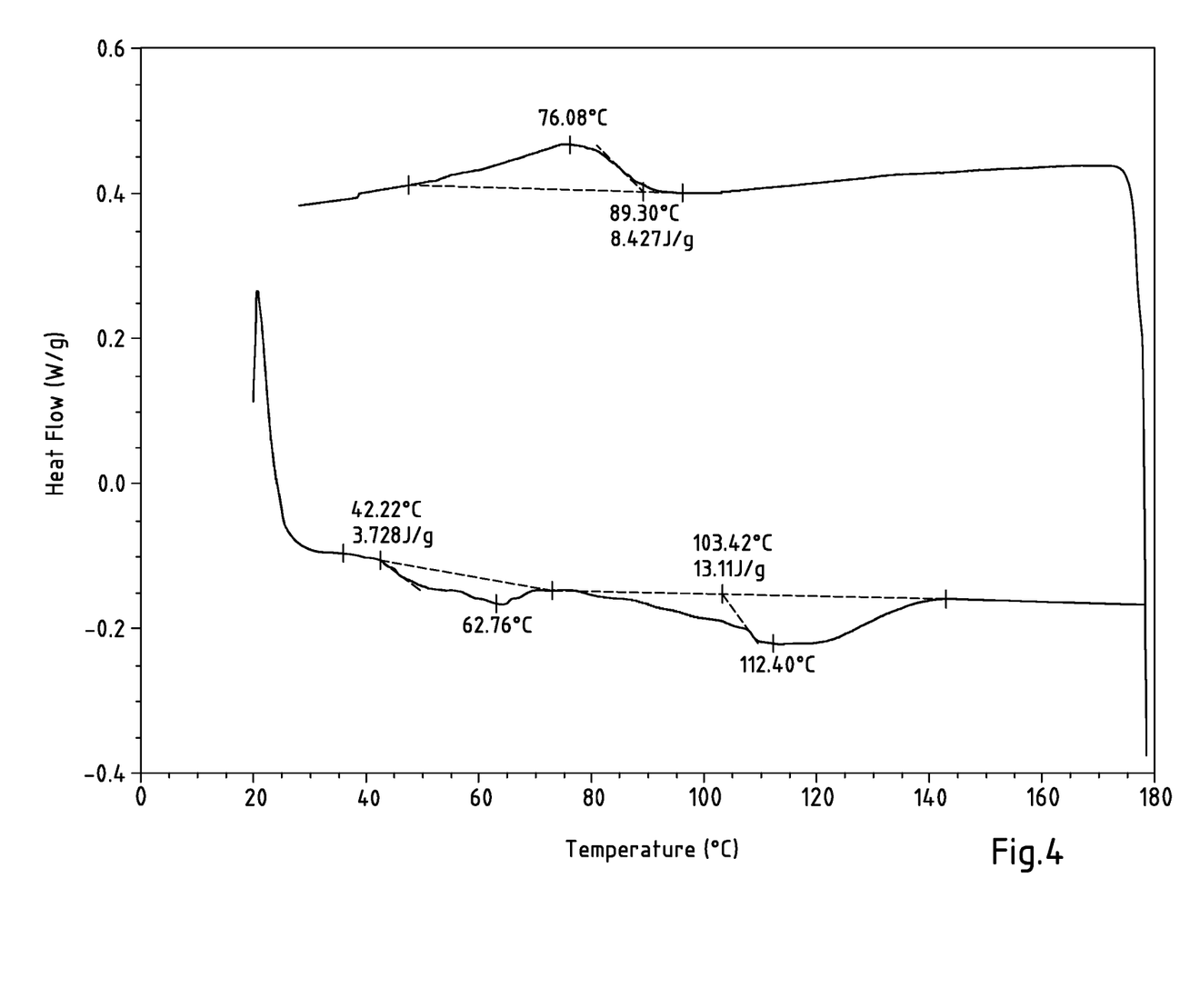
FIG. 4 shows a differential scanning calorimetry (DSC) analysis of a functional layer comprising 0.6 wt. %, based on the total mass of the functional layer, of a different nucleating agent.

Samples were taken from the functional layers FL1 to FL3 as well as FL4 and investigated by DSC in the range of 25° C. to 200° C. (25° C. to 180° C. for FL4) using a Q20 DSC from TA instruments at a heating rate of 10° C./min. The corresponding DSC curves of FL1 to FL3 are shown in FIGS. 1 to 3. The corresponding DSC curve of FL4 is shown in FIG. 4. Exothermic peaks are up in these Figures. As can be seen from FIG. 1, the crystallization temperature for FL1 (without a nucleating agent) is at 70.33° C. Upon addition of 0.4 wt. % nucleating agent (FL2), the crystallization temperature is increased to 71.13° C. Moreover, upon addition of 0.6 wt. % nucleating agent (FL3), the crystallization temperature is increased to 73.54° C. Lastly, upon addition of 0.6 wt. % of a different nucleating agent, Nuc2, the crystallization temperature is increased to 76.08° C. It thus follows that the addition of the nucleating agents leads to crystallization at higher temperatures which helps to increase the production speed.

Edge strips comprising a functional layer and a structural layer were manufactured by subsequent application using post extrusion.

A single screw extruder with an L/D of 25/1 equipped with a die yielding a 0.2 mm thick and 23 mm wide sheet was used to apply the functional layer to a 2 mm thick sheet from acrylonitrile-butadiene-styrene copolymer serving as structural layer (referred to in the Examples as post extrusion). Of course, it is also possible to manufacture other widths, such as from 8 to 420 mm, which may be cut if necessary.

Edge strips with a structural layer made from acrylonitrile-butadiene-styrene copolymer and the functional layers according to Tables 2a and 2b below were manufactured by post extrusion of the functional layer to the acrylonitrile-butadiene-styrene copolymer sheet. Sodium octacosanoate (Nuc) was used as a nucleating agent because 1,2,3-tridesoxy-4,6:5,7-bis-O-[(4-propylphenyl)methylene]nonitol sorbitol (Nuc 2) exhibited an unwanted clarifying effect.

TABLE 2a

Manufactured edge strips each with a structural layer from acrylonitrile-butadiene-styrene copolymer. Amounts of the compounds of the functional layer in wt. %.

| Cpd | Amount of Compound in Functional Layer of Edge Strip No. [wt. %] | | | | | | | |
|---|---|---|---|---|---|---|---|---|
| | 1[i] | 2 | 3 | 4 | 5 | 6 | 7 | 8 |
| TPU1 | 96.5 | 91.5 | 86.5 | 81.5 | 85.9 | 79 | 78 | 79 |
| TPU2 | 0 | 5 | 10 | 15 | 10 | 9 | 9 | 9 |
| Filler | 0 | 0 | 0 | 0 | 0 | 7 | 7 | 7 |
| Nuc | 0 | 0 | 0 | 0 | 0.6 | 0.6 | 0.6 | 0.6 |
| LP | 1 | 1 | 1 | 1 | 1 | 1 | 1 | 0 |
| Add | 2.5[a] | 2.5[b] | 2.5[c] | 2.5[d] | 2.5[e] | 3.4[f] | 4.4[g] | 4.4[h] |

Explanations to Table 2a:
Cpd—Compound;
[a]only pigment;
[b]only pigment;
[c]only pigment;
[d]only pigment;
[e]only pigment;
[f]pigment, chain extender, antioxidants;
[g]pigment, chain extender, antioxidants, UV stabilizer;
[h]pigment, chain extender, antioxidants, UV stabilizer;
[i]comparative example.

TABLE 2b

Manufactured edge strips each with a structural layer from acrylonitrile-butadiene-styrene copolymer. Amounts of the compounds of the functional layer in wt. %.

| Cpd | Amount of Compound in Functional Layer of Edge Strip No. [wt. %] | | | |
|---|---|---|---|---|
| | 9[c] | 10 | 11 | 12[c] |
| TPU1 | 0 | 0 | 84.5 | 0 |
| TPU2 | 10 | 10 | 10 | 0 |
| TPU3 | 0 | 84.5 | 0 | 0 |
| TPU4 | 86 | 0 | 0 | 96 |

TABLE 2b-continued

Manufactured edge strips each with a structural layer from acrylonitrile-butadiene-styrene copolymer. Amounts of the compounds of the functional layer in wt. %.

| Cpd | Amount of Compound in Functional Layer of Edge Strip No. [wt. %] | | | |
|---|---|---|---|---|
| | 9[c] | 10 | 11 | 12[c] |
| Nuc | 0 | 0.6 | 0.6 | 0 |
| LP | 1 | 1 | 1 | 1 |
| Add | 3[a] | 3.9[b] | 3.9[b] | 3[a] |

Explanations to Table 2b:
Cpd—Compound;
[a]pigment and antioxidants;
[b]pigment, chain extender, and antioxidants;
[c]comparative example.

In the manufacturing process, the edge strips were passed under an embossing roller to emboss a relief pattern onto the surface of the functional layer. The relief had a surface roughness Rz measured according to DIN EN ISO 4287: 2010-07 of 20 to 25 µm. The resulting edge strips were then rolled up for storage. Rolling up of the edge strip was done after only a short cooling time. No blocking inside the edge strip roll was observed.

The edge strips 1 to 7 and 10 to 11 were then fixed to MFC and MDF boards with a thickness of 18 mm by activating the functional layer with a laser as well as by heating the functional layer with hot air at 450° C. and 4 bar. The edge strips were pneumatically pressed with the activated or heated functional layer to the narrow side of the MFC or MDF board employing a machine set pressure of 2 bar at a line speed of 18 m/min. The laser activation was done with a laser power of 25 J/cm². A Homag PROFI KAL330/9/A3/L (2013) machine was used for fixing the edge strip to the boards by laser activation. A Homag EDGETEQ S-380 OPTIMAT KDF 650 C (2019) machine was used for fixing the edge strip to the boards by heating. It should be noted that a machine set pressure of 2 bar is a commonly employed machine set pressure for boards with thicknesses of 16 to 36 mm.

Edge strip 8 was fixed to an MFC and an MDF board with a thickness of 18 mm by heating the functional layer with hot air at 450° C. and 4 bar and pneumatically pressing the edge strip with the heated functional layer to the narrow side of the MFC or MDF board employing a machine set pressure of 2 bar at a line speed of 18 m/min. A Homag EDGETEQ S-380 OPTIMAT KDF 650 C (2019) machine was used. It should be noted that a machine set pressure of 2 bar is a commonly employed machine set pressure for boards with thicknesses of 16 to 36 mm.

Edge strip 9 was fixed to an MFC and an MDF board with a thickness of 18 mm by activating the functional layer with a laser. The same machine and the same settings were used as for edge strips 1 to 7 and 10 to 11 for the fixing by laser activation.

Edge strip 12 was fixed to an MFC board with a thickness of 18 mm by activating the functional layer with a laser as well as by heating the functional layer with hot air at 450° C. and 4 bar. The same machine and the same settings were used as for edge strips 1 to 7 and 10 to 11 for the fixing by laser activation and by heating, respectively. Edge strip 12 was also fixed to an MDF board with a thickness of 18 mm by activating the functional layer with a laser. The same machine and the same settings were used as for edge strips 1 to 7 and 10 to 11 for the fixing by laser activation.

The average peel strengths as well as other properties for the edge strips 1 to 8 are compiled in Table 3 below. The average peel strengths as well as other properties for the edge strips 9 to 12 are compiled in Table 4 below.

For all edge strips mounted to the boards, the edge strip protruded over the narrow side of the boards on both sides. The protrusions were removed by milling such that the surface of the boards merged with the edge strip without a step.

The behavior of the edge strip during affixing was monitored. Movement of the edge strip during affixing is undesired and is recognized as a part of smearing. Protruding of the functional layer in vertical direction from the joint is recognized as another part of smearing. Drawing of strands or misplacement of the edge strip during milling of the part of the edge strip protruding over the narrow side of the boards was recognized as another part of smearing. The intensity of the smearing is compiled in Table 3 for the edge strips 1 to 8 and in Table 4 for the edge strips 9 to 12 together with the average peel strength of the edge strip from the boards and with further properties of the functional layer of the respective edge strips. No significant difference was found for edge strips 1 to 7 affixed by laser activation or by heating with hot air for the average peel strength.

TABLE 3

Properties of the edge strips affixed to the boards and for the functional layers.

| Property | Edge Strip No. | | | | | | | |
|---|---|---|---|---|---|---|---|---|
| | 1[g] | 2[g] | 3[g] | 4[g] | 5[g] | 6[g] | 7[g] | 8 |
| Av. Peel strength MFC [N/mm][a] | 1.2 | 3.7 | 4.5 | 5.2 | 4.5 | 4.8 | 4.8 | 4.8 |
| Av. Peel strength MDF [N/mm][a] | 2.5 | 6.9 | 7.5 | 8.1 | 7.5 | 7.9 | 7.8 | 7.9 |
| Smearing[b] | 5 | 4 | 3 | 2 | 3 | 4-5 | 4-5 | 4-5 |
| Hardness [Shore A][c] | 90 | 87 | 85 | 82 | 85 | 86 | 88 | 86 |
| MFI (150° C., 2.16 kg) [g/10 min][d] | 12 | 14.4 | 18 | 19.8 | 18 | 17.3 | 17.3 | 17.3 |
| Melting Temperature [° C.][e] | 110 | 115 | 105 | 100 | 105 | 105 | 105 | 105 |
| Tensile Strength [kg/cm²][f] | 300 | 273 | 264 | 249 | 273 | 265 | 265 | 265 |

Explanations to Table 3:
[a]Average Peel strength, determined according to norm DIN EN 1464: 2010-06;
[b]visual assessment of smearing from 1 (worst) to 5 (best) depending on movement of the edge strip on fixing to MDF or MFC boards, whether the functional layer protruded in vertical direction beyond the joint, and whether the joint drew strands band upon milling (reported values are for edge strips affixed by heating with hot air);
[c]Hardness of the functional layer of the edge strip determined according to norm ISO 868: 2003-03;
[d]Melt flow index of the functional layer of the edge strip determined according to norm ASTM D 1238 - 04;
[e]Melting temperature of the functional layer of the edge strip determined according to norm ISO 11357-3: 2018;
[f]Tensile strength of the functional layer of the edge strip determined according to norm ASTM D412-16;
[g]edge strip affixed to board using laser activation and heating with hot air.

As can be seen from Table 3, addition of the aromatic thermoplastic polyurethane increased the average peel strength (edge strips 1 to 4). However, at the same time, the smearing became worse upon adding the aromatic thermoplastic polyurethane. Smearing could be improved despite the presence of an aromatic thermoplastic polyurethane upon adding a nucleating agent (edge strip 5) as well as further adding a filler together with a chain extender and antioxidants (edge strips 6 and 7). Edge strips 6 and 7 additionally showed long term heat stability. Edge strip 8 additionally showed good UV resistance. As is apparent from edge strips 1 to 7, the functional layer is very versatile since the same composition can be employed both for application by laser and by hot air.

TABLE 4

Properties of the edge strips affixed to the boards and for the functional layers.

| Property | Edge Strip No. | | | |
|---|---|---|---|---|
| | 9 | 10 | 11 | 12 |
| Av. Peel strength MFC (L) [N/mm]$^a$ | 0.4 | 4.1 | 4.8 | 0.7 |
| Av. Peel strength MFC (H) [N/mm]$^b$ | n/d$^h$ | 3.9 | 5.1 | 1.1 |
| Av. Peel strength MDF (L) [N/mm] | 1.1 | 5.5 | 8.5 | 0.8 |
| Av. Peel strength MDF (H) [N/mm]$^b$ | n/d$^h$ | 5.9 | 8.8 | n/d$^h$ |
| Smearing$^c$ | n/d$^h$ | 3-4 | 3-4 | n/d$^h$ |
| Hardness [Shore A]$^d$ | n/d$^h$ | 87 | 86 | 90 |
| MFI (150° C., 2.16 kg) [g/10 min]$^e$ | n/d$^h$ | 38 | 18.4 | n/d$^h$ |
| Melting Temperature [° C.]$^f$ | n/d$^h$ | 105 | 105 | n/d$^h$ |
| Tensile Strength [kg/cm$^2$]$^g$ | n/d$^h$ | n/d$^h$ | n/d$^h$ | n/d$^h$ |

Explanations to Table 4:
$^a$Average Peel strength for edge strip affixed using laser activation, determined according to norm DIN EN 1464: 2010-06;
$^b$Average Peel strength for edge strip affixed using heating with hot air, determined according to norm DIN EN 1464: 2010-06;
$^c$visual assessment of smearing from 1 (worst) to 5 (best) depending on movement of the edge strip on fixing to MDF or MFC boards, whether the functional layer protruded in vertical direction beyond the joint, and whether the joint drew strands band upon milling (reported values are for edge strips affixed by heating with hot air);
$^d$Hardness of the functional layer of the edge strip determined according to norm ISO 868: 2003-03;
$^e$Melt flow index of the functional layer of the edge strip determined according to norm ASTM D 1238 - 04;
$^f$Melting temperature of the functional layer of the edge strip determined according to norm ISO 11357-3: 2018;
$^g$Tensile strength of the functional layer of the edge strip determined according to norm ASTM D412-16;
$^h$not determined.

As can be seen from Table 4, a functional layer containing a combination of an aromatic thermoplastic polyurethane with a higher melt flow index and an aromatic thermoplastic polyurethane with a lower melt flow index (edge strip 9) does not exhibit acceptable peeling strengths when fixed to MFC or MDF boards using laser activation. Edge strips 10 and 11 displayed satisfactory peeling strengths with edge strip 11 showing very high peeling strengths on MDF boards. Moreover, edge strip 12 demonstrates that a functional layer using only an aromatic thermoplastic polyurethane displays unacceptable peeling strengths when fixed to MFC or MDF boards.

The invention claimed is:

1. An edge strip, comprising:
   at least one functional layer for affixing the edge strip to a narrow side of a workpiece,
   wherein the functional layer contains an aliphatic thermoplastic polyurethane and an aromatic thermoplastic polyurethane.
2. The edge strip according to claim 1, wherein the aliphatic thermoplastic polyurethane has a melt flow index of 2 to 100 g/10 min, wherein the melt flow index of the aliphatic thermoplastic polyurethane is determined according to ASTM D 1238-04 at a temperature of 150° C. using a weight of 2.16 kg, and/or wherein the aromatic thermoplastic polyurethane has a melt flow index of 2 to 100 g/10 min, wherein the melt flow index of the aromatic thermoplastic polyurethane is determined according to ASTM D 1238-04b at a temperature of 150° C. using a weight of 2.16 kg.
3. The edge strip according to claim 1, wherein the functional layer contains the aliphatic thermoplastic polyurethane in an amount of 10 to 90 wt. %, based on the total mass of the functional layer, and/or the aromatic thermoplastic polyurethane in an amount of 1 to 90 wt. %, based on the total mass of the functional layer.
4. The edge strip according to claim 1, wherein the functional layer contains a filler.
5. The edge strip according to claim 4, wherein the filler is an inorganic filler.
6. The edge strip according to claim 1, wherein the functional layer contains a nucleating agent.
7. The edge strip according to claim 6, wherein the nucleating agent is selected from an alkaline metal salt of a carboxylic acid having 10 to 40 carbon atoms, silicic acid, cyanuric acid, sorbitol derivatives such as bis(benzylidene) sorbitol, 1,3-di(p-hydroxyl) benzylidene sorbitol, 2,4-di (p-hydroxyl) benzylidene sorbitol, phosphonium salts, triphenyl phosphine, tributyl phosphine, trimethyl phosphine, dimethyl phenyl phosphine, methyl diphenyl phosphine, tris(2-ethylhexyl) phosphine, tetrabutyl-phosphonium hexafluorophosphate, tetrabutyl-phosphonium-hydrogen sulfate, tetrabutylammonium-phenylphosphonate), pyridinium salts, tritylpyridinium tetrafluoroborate, pyrrolidinium salts, 1-butyl-1-methylpyrrolidinium bromide, sulfonium salts, triphenylsulfonium tetrafluoroborate, sulfonates, sodium octyl sulfonate, phosphonates, phosphonic acids, phosphonic esters, phosphonic salts, phosphinic acid, phosphinic esters, phosphinic salts, phosphonamides, phosphinamides, phosphonates, tetrabutylammonium phenylphosphonate, and mixtures thereof, or from an alkaline metal salt of a carboxylic acid having 10 to 40 carbon atoms, cyanuric acid, sorbitol derivatives such as bis(benzylidene)sorbitol, 1,3-di(p-hydroxyl) benzylidene sorbitol, 2,4-di (p-hydroxyl) benzylidene sorbitol, phosphonium salts, triphenyl phosphine, tributyl phosphine, trimethyl phosphine, dimethyl phenyl phosphine, methyl diphenyl phosphine, tris(2-ethylhexyl) phosphine, tetrabutyl-phosphonium hexafluorophosphate, tetrabutyl-phosphonium-hydrogen sulfate, tetrabutylammonium-phenylphosphonate), pyridinium salts, tritylpyridinium tetrafluoroborate, pyrrolidinium salts, 1-butyl-1-methylpyrrolidinium bromide, sulfonium salts, triphenylsulfonium tetrafluoroborate, sulfonates, sodium octyl sulfonate, phosphonates, phosphonic acids, phosphonic esters, phosphonic salts, phosphinic acid, phosphinic esters, phosphinic salts, phosphonamides, phosphinamides, phosphonates, tetrabutylammonium phenylphosphonate, and mixtures thereof.
8. The edge strip according to claim 1, wherein the functional layer contains an additive selected from the group consisting of antioxidants, UV absorbers, chain extenders, pigments, dyes, antislip agents, antiblock agents, flow modifiers, hindered amine light stabilizers, and mixtures thereof.
9. The edge strip according to claim 1, wherein the functional layer contains energy absorbing additives.
10. The edge strip according to claim 1, wherein a surface of the functional layer at least partially has a relief pattern.
11. The edge strip according to claim 1, wherein the edge strip comprises two or more functional layers.

12. The edge strip according to claim 1, wherein the edge strip comprises a structural layer connected to the functional layer.

13. The edge strip according to claim 12, wherein the structural layer is made from paper, cardboard, veneer, continuous pressure laminate, or a thermoplastic material.

14. The edge strip according to claim 1, wherein the functional layer is connected to the structural layer by means of coextrusion or injection molding.

15. The edge strip according to claim 12, wherein the functional layer is applied to the structural layer in an additional step after manufacturing the structural layer.

16. The method for manufacturing an edge strip according to claim 1, comprising forming at least one functional layer.

17. The method according to claim 16, wherein a structural layer is coextruded with the functional layer or wherein the functional layer is applied to a structural layer.

18. The method according to claim 16, wherein a relief pattern is applied to a surface of the functional layer.

19. The method for affixing an edge strip according to claim 1 to a narrow side of a workpiece, wherein the functional layer is activated using at least one of laser, microwaves, ultrasound, infrared, and hot air.

20. The method for affixing a strip to a narrow side of a workpiece comprising applying an edge strip according to claim 1, wherein the edge strip consists of the at least one functional layer.

21. The use of an edge strip according to claim 1, wherein the edge strip consists of the at least one functional layer as an adhesive layer for affixing a strip, to a narrow side of a workpiece.

22. A use of a relief pattern with a surface roughness Rz of 10 to 70 μm, measured according to DIN EN ISO 4287:2010-07, on a surface of a functional layer of an edge strip to reduce blocking of the edge strip.

* * * * *

UNITED STATES PATENT AND TRADEMARK OFFICE
CERTIFICATE OF CORRECTION

PATENT NO. : 12,441,919 B2  
APPLICATION NO. : 18/017118  
DATED : October 14, 2025  
INVENTOR(S) : Yasemen Gökkurt Page 1 of 1

It is certified that error appears in the above-identified patent and that said Letters Patent is hereby corrected as shown below:

In the Claims

Column 17, Line 67, Claim 2, delete "1238-04" and insert -- 1238-04b --

Signed and Sealed this  
Ninth Day of December, 2025

John A. Squires  
*Director of the United States Patent and Trademark Office*